United States Patent Office 2,868,309
Patented Jan. 13, 1959

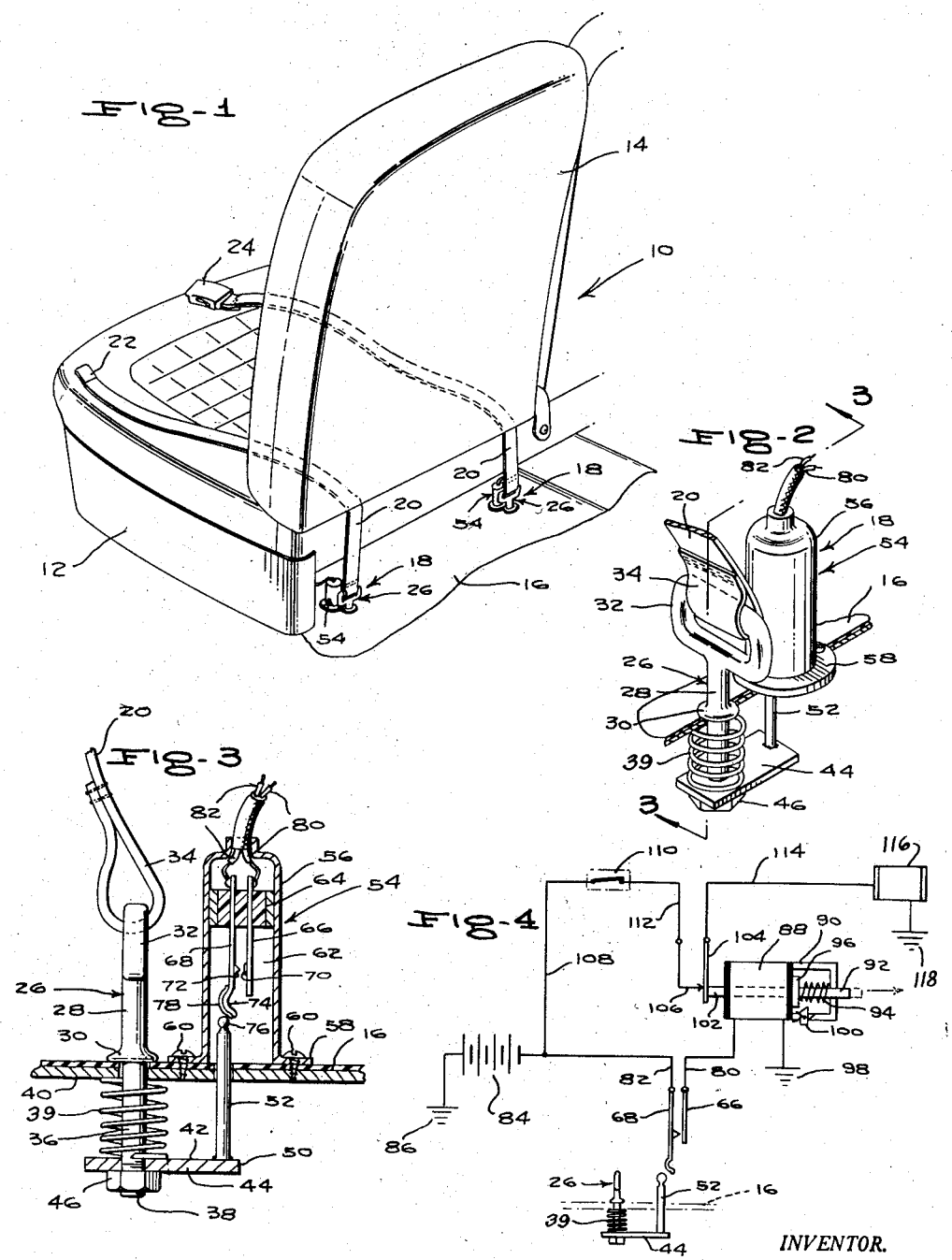

2,868,309

IGNITION SAFETY SYSTEM CUT-OUT SWITCH

Charles Ross Burgess, Toronto, Ontario, Canada; The Royal Trust Company, Elizabeth K. Burgess and Ralph E. Burgess, executors of said Charles R. Burgess, deceased Application January 31, 1956, Serial No. 562,572

4 Claims. (Cl. 180—82)

This invention relates generally to vehicle safety systems and is more particularly concerned with a novel ignition safety system cut-out switch activated by a predetermined force applied on a safety belt during a major collision, when striking an obstacle, etc.

During major vehicular accidents, such as collisions with other vehicles, forced landings of aircraft, etc. the ignition circuit when activated provides a potential source of fire in conjunction with fuel fumes prevalent during such accidents.

A primary object of invention is to overcome the inherent danger of fire resulting during major vehicular accidents of the character mentioned above, providing a safety system activated by force applied on the anchor means of a vehicle safety belt wherein said force is operative to control an electrical circuit operable to deactivate a vehicle ignition system thus eliminating this potential source of fire danger.

A further object of invention in conformance with that set forth is to provide a displaceable anchor bolt for a safety belt assembly wherein the anchor bolt is operatively engaged with force transmitting means engageable with a control switch for activating an electrical circuit which controls switch means for deactivation of a vehicle ignition system.

A further object of invention in conformance with that set forth is to provide in an ignition safety system of the character set forth a cut-out switch mechanism which is readily and economically manufactured, easily installed and maintained, and highly satisfactory, practical and utilitarian for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a vehicle seat in conjunction with a safety belt anchored to the floor, and showing the novel cut-out switch of the invention mounted in position on the vehicle floor;

Figure 2 is an enlarged fragmentary perspective view of a portion of Figure 1 showing the manner in which one of the ends of the safety belt is anchored on a displaceable anchor bolt, with a portion of the vehicle floor broken away and shown in section for clarity;

Figure 3 is a sectional view taken substantially on line 3—3 of Figure 2; and

Figure 4 is a diagrammatic view showing the circuit diagram of the novel ignition safety system.

Referring to the drawings, a fragmentary portion of a vehicle seat is indicated generally at 10 including a bottom seat portion 12 upon which a passenger of the vehicle is normally seated, a back rest portion 14, and a vehicle floor 16.

Indicated generally at 18 are anchor bolt assemblies in conjunction with switch mechanism which are operatively connected to one end of flexible safety belt members 20, the other ends of the safety belts 20 incorporating conventional cooperating detachable connecting means indicated at 22 and 24, it being understood that when utilizing the same, the safety belt elements 20 may be disposed in overlying relationship relative to the chest or lap of a passenger of the vehicle. Furthermore, it is to be understood that during a collision, or when striking an obstacle, etc. when the safety belt elements 20 are properly disposed across the forward portion of a passenger of the vehicle, the force of inertia will result in applying an excessive tension on said safety belt elements, the purpose of the same being to retain the passenger from being thrown forward as a result of this force.

As most clearly seen in Figures 2 and 3, the anchor bolt assemblies comprise anchor bolt elements indicated generally at 26, including a shank portion 28 having an intermediate annular flange 30 engageable in overlying engagement on the upper surface portion of the vehicle floor 16, the shank portion extending through a suitable aperture therein. The shank member 28 terminates in an upper suitable eye portion 32 through which is threaded the lower end 34 of the suitably secured flexible belt 20. The shank 28 continues below the flange 30 as an elongated bolt member 36 having a lower threaded end 38, and circumposed about the bolt portion 36 is a coiled spring 39 of a predetermined size, extending between a lower surface portion 40 of the floor 16 and upper surface portion 42 of a suitably apertured laterally extending force transmitting lever element 44. Secured on the threaded end 38 of the bolt is a suitable securing nut 46 which engages a lower surface portion of the force transmitting lever 44, and which may be utilized for adjusting the switch actuating structure to be subsequently described, as well as for the purpose of applying a predetermined force on the previously mentioned coil spring indicated at 39.

Suitably secured on the terminal end 50 of the force transmitting lever 44 is an upwardly extending actuating rod 52 which extends through a suitable aperture portion in the floor board 16 in substantially parallel relationship to the bolt shank 28. The switch actuating mechanism or control switch is indicated at 54 and comprises a housing member 56 terminating in a lower annular mounting flange portion 58 suitably apertured and secured on the floor 16 by means of suitable fastening elements 60, such as metal screws. Extending transversely across the interior 62 of the housing 56 is an insulated support block 64 suitably secured therein and which supports a pair of resilient contact elements 66 and 68 which are retained in spaced relationship but which include oppositely disposed contact portions 70 and 72, respectively, which when engaged, since they are made from any suitable electrical conducting material will close a circuit for a purpose to subsequently become apparent. The element 68 includes a lower extending portion 74 which is offset and extends into the path of reciprocable movement of the actuating rod 52 when the same is moved with the lever 44, such reciprocable movement being operable to urge the contacts 70 and 72 into engagement. The offset portion 74 of the contact element 68 includes on the side engageable with the upper end 76 of the rod 52, a suitably secured insulating element 78 preventing accidental conduction of electrical current to the floor 16 which might possibly result in an electrical shock to the operator or to a person in the vehicle.

The upper ends of the contact elements 66 and 68 are suitably secured to electrical conduction leads 80 and 82, respectively, the lead 82 being connected to a suitable source of potential, such as a battery indicated diagrammatically at 84 which may be grounded at 86 to the vehicle frame, for example, as is conventionally found in a single line vehicle electrical system.

The other lead 80 is connected to a solenoid coil 88 which may be incorporated in a suitable support housing 90, and a solenoid actuated armature rod 92 is supported in the housing 90 having a spring element 94 circumposed thereabout and extendable between a support flange 96 and an inner surface portion of the housing 90. The flange 96 is integral with the rod 92, thus movement in the direction indicated by the direction arrow in Figure 4 results in an application of pressure on the coil spring 94 in a manner to subsequently become apparent. When the solenoid coil 88 is activated by the closing of the contacts 70 and 72 of the elements 66 and 68, respectively, the coil being grounded at 98 through the vehicle chasis for completing the circuit, the flange 96 will be operative to move a dog element 100 which is spring urged in any suitable manner in opposite direction to the flange 96 in the direction indicated by the direction arrow, said dog element being effective to retain the flange 96 and accordingly the rod 92 integral therewith in a rightward disposed position as seen in Fig. 4. Suitably secured on the end 102 of the rod 92 is an electrical contact element 104 which is engageable with a cooperating contact element 106 closing the circuit of the vehicle ignition system. Indicated diagrammatically is a conduction wire 108 connected to the source of potential 84 and an ignition switch 110, said ignition switch being connected by means of a suitable electrical conductor wire 112 to the aforementioned contact 106, the contact element 104 being connected by means of the electrical conducting line 114 to an ignition coil 116 which is grounded as indicated at 118.

After an accident and the danger of fire has passed, the dog element 100 may be manually moved after which time the spring 94 will be effective to urge the contacts 104 and 106 into engagement with each other for permitting the reactivation of the ignition circuit of the vehicle system.

Although one type of reset relay has been disposed in this invention, it is to be understood that any conventional manually operated reset relay may be incorporated in the safety system.

Furthermore, as seen in Figure 1, there has been shown control switch mechanisms 54 cooperating with each of the anchor bolts 26 of the safety belt assembly, however, only one of the same can be used in the system, it being understood, that all of the seats of the vehicle may incorporate safety belts for the various passengers therein, incorporating therewith the previously described safety devices.

Various positional, directional terms such as "upper," "lower," etc. are utilized herein to have a relative connotation to aid in describing the device, and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a vehicle, an inertia actuated safety system comprising a safety belt secured from the vehicle floor for overlying relationship relative to a seated passenger, a displaceable safety belt anchor bolt element supported on the vehicle floor and secured to an end of the safety belt for displacement in response to a predetermined inertia-applied tension on the safety belt, spring means engaged with the anchor bolt for retaining the bolt against displacement below a predetermined tension, switch actuating means connected to the anchor bolt and movable therewith for actuating a switch mechanism, switch mechanism engageable by the switch actuating means in response to displacement of the anchor bolt element, a control circuit connected to the switch mechanism, a vehicle ignition system, a relay switch connected to the control circuit and ignition system for actuation by the switch mechanism for cutting out the vehicle ignition system in response to the predetermined inertia-applied tension force on the safety belt.

2. In an inertia actuated safety system as set forth in claim 1 wherein the displaceable anchor bolt is reciprocably supported transversely through the floor board of the vehicle, the spring means comprising a coil spring circumposed about the anchor bolt below the floor board of the vehicle.

3. A collision actuated safety system for vehicles comprising a safety belt securable in overlying relationship to a vehicle passenger, a displaceable safety belt anchor bolt element supported on the vehicle and secured to an end of the safety belt for displacement in response to application of a predetermined tension on the safety belt, spring means engaged with the anchor bolt for retaining the bolt against displacement below a predetermined tension, switch actuating means connected to the anchor bolt and movable therewith for actuating a switch mechanism, switch mechanism engageable by the switch actuating means in response to displacement of the anchor bolt element, a control circuit connected to the switch mechanism, a vehicle ignition system, a relay switch connected in the control circuit and the ignition system for actuation by the switch mechanism for cutting out the vehicle ignition system in response to an application of a predetermined tension force on the safety belt, the displaceable anchor bolt being reciprocably supported on the floor board of the vehicle, the spring means comprising a coil spring circumposed about the anchor bolt, the switch actuating means comprising a force transmitting lever element extending laterally from the anchor bolt, the switch mechanism comprising a pair of spaced resilient electrical contact elements engageable in response to movement of the lever assembly with the anchor bolt.

4. In a vehicle safety system, an ignition cut-out switch assembly comprising a displaceable safety belt anchor bolt, spring means operatively connected to the anchor bolt for permitting displacement of the bolt in response to a predetermined application of tension on the safety bolt, force transmitting means operatively connected to the anchor bolt, and an ignition circuit including a switch mechanism engageable by the force transmitting means for grounding the ignition circuit in response to application of a predetermined force on the anchor bolt, said switch mechanism comprising a pair of spaced resilient electrical contact elements engageable in response to movement of the force transmitting means with the anchor bolt.

References Cited in the file of this patent

UNITED STATES PATENTS

| | | |
|---|---|---|
| 747,370 | Brislin | Dec. 22, 1903 |
| 894,052 | Radtke | July 21, 1908 |
| 2,192,262 | Griesedieck | Mar. 5, 1940 |
| 2,280,694 | Embree et al. | Apr. 21, 1942 |
| 2,296,003 | Van Loo | Sept. 15, 1942 |
| 2,660,715 | Glass et al. | Nov. 24, 1953 |
| 2,716,561 | Beran | Aug. 30, 1955 |